(12) United States Patent
Lavine et al.

(10) Patent No.: US 12,072,482 B2
(45) Date of Patent: Aug. 27, 2024

(54) TELESCOPE WITH STIFFENING RIB

(71) Applicant: Raytheon Company, Waltham, MA (US)

(72) Inventors: Jason R. Lavine, McKinney, TX (US); Justin O. Compton, Prosper, TX (US)

(73) Assignee: RAYTHEON COMPANY, Waltham, MA (US)

(*) Notice: Subject to any disclaimer, the term of this patent is extended or adjusted under 35 U.S.C. 154(b) by 33 days.

(21) Appl. No.: 18/157,625

(22) Filed: Jan. 20, 2023

(65) Prior Publication Data

US 2024/0248295 A1 Jul. 25, 2024

(51) Int. Cl.
*G02B 23/10* (2006.01)
*F41H 13/00* (2006.01)
*G02B 23/16* (2006.01)

(52) U.S. Cl.
CPC ......... *G02B 23/105* (2013.01); *F41H 13/005* (2013.01); *G02B 23/16* (2013.01)

(58) Field of Classification Search
CPC ...... G02B 23/105; G02B 23/16; F41H 13/005
See application file for complete search history.

(56) References Cited

U.S. PATENT DOCUMENTS

| | | | |
|---|---|---|---|
| 7,236,299 B1 | 6/2007 | Smith | |
| 7,952,691 B2 | 5/2011 | Mosier et al. | |
| 9,421,641 B2 | 8/2016 | Taylor et al. | |
| 10,859,348 B1* | 12/2020 | Dupuis | G02B 26/0816 |
| 11,536,543 B2* | 12/2022 | Uyeno | G01S 3/043 |
| 2008/0042042 A1 | 2/2008 | King et al. | |
| 2010/0282942 A1 | 11/2010 | Mosier et al. | |

OTHER PUBLICATIONS

International Search Report with Written Opinion issued in International Application No. PCT/US2024/011758; International Filing Date Jan. 17, 2024; Date of Mailing Jun. 6, 2024 (13 pages).

* cited by examiner

*Primary Examiner* — Seung C Sohn
(74) *Attorney, Agent, or Firm* — CANTOR COLBURN LLP

(57) ABSTRACT

A directed energy system is provided and includes a housing defining an unobscured aperture for emitted electromagnetic (EM) radiation and a stiffening strut assembly installed at an outlet of the housing and through which the emitted EM radiation passes. The directed energy system and various elements such as the telescope and optical trains described herein are well suited for, but not limited to, high-energy (HE) laser applications.

20 Claims, 3 Drawing Sheets

TELESCOPE WITH STIFFENING RIB

BACKGROUND

The present disclosure relates to optical telescopes and optical trains and, in particular, to a telescope with an improved stiffening rib design. The telescope and optical trains are well suited for use in directed energy applications.

Directed energy weapons, directed energy applications (including, but not limited to, applications such as power-beaming), directed energy optical trains (including, but not limited to, application telescopes and expansion optics), and/or directed energy telescopes and, specifically, HEL weapons or optical trains are being considered for a variety of military applications with respect to a variety of platforms. These platforms include, but are not limited to, spaceborne, airborne and land-based systems. The weapons or telescopes generally involve the use of a laser or other source of a high-power beam of electromagnetic radiation to track, deposit energy in a controlled manner, and, in some cases, destroy an intended target. To achieve mission objectives, directed energy weapons or telescopes must accurately track the intended target and maintain a HEL beam on the target until an intended outcome is achieved.

SUMMARY

According to an aspect of the disclosure, a directed energy (DE) system, e.g., a high-energy (HE) laser system, is provided and includes a housing defining an unobscured aperture for emitted electromagnetic (EM) radiation and a stiffening strut assembly installed at an outlet of the housing and through which the emitted EM radiation passes.

In accordance with one or more embodiments, the housing includes a single open end and defines a first opening through which the EM radiation passes and a mirror disposed to reflect the EM radiation toward the single open end.

In accordance with one or more embodiments, the HE laser further includes a specular window and/or opening disposed in the single open end in a path of the EM radiation.

In accordance with one or more embodiments, the stiffening strut assembly includes horizontal baffles supported at opposite ends thereof by the housing at the outlet of the housing.

In accordance with one or more embodiments, the stiffening strut assembly includes a partial or complete annular central member and multiple struts disposed to support the partial or complete annular central member in the outlet of the housing and supported at respective distal ends thereof by the housing at the outlet of the housing.

In accordance with one or more embodiments, the partial or complete annular central member is circular.

In accordance with one or more embodiments, the stiffening strut assembly includes a partial or complete polygonal central member and multiple struts disposed to support the partial or complete polygonal central member in the outlet of the housing and supported at respective distal ends thereof by the housing at the outlet of the housing.

In accordance with one or more embodiments, the partial or complete polygonal central member is rectangular.

In accordance with one or more embodiments, the stiffening strut assembly includes reflective caps configured to reflect the EM radiation.

In accordance with one or more embodiments, the housing is an optically black barrel and the stiffening strut assembly includes thermally isolated optical black struts.

According to an aspect of the disclosure, a high-energy (HE) laser system is provided and includes a housing defining an unobscured aperture for emitted electromagnetic (EM) radiation, the housing including a single open end and defining a first opening through which the EM radiation passes, a mirror disposed to reflect the EM radiation incident from the first opening and toward the single open end and a stiffening strut assembly installed at an outlet of the housing opposite the mirror and through which the emitted EM radiation passes.

In accordance with one or more embodiments, the HE laser system further includes a specular window and/or opening disposed in the single open end in a path of the EM radiation.

In accordance with one or more embodiments, the stiffening strut assembly includes horizontal baffles supported at opposite ends thereof by the housing at the outlet of the housing.

In accordance with one or more embodiments, the stiffening strut assembly includes a partial or complete annular central member and multiple struts disposed to support the partial or complete annular central member in the outlet of the housing and supported at respective distal ends thereof by the housing at the outlet of the housing.

In accordance with one or more embodiments, the partial or complete annular central member is circular.

In accordance with one or more embodiments, the stiffening strut assembly includes a partial or complete polygonal central member and multiple struts disposed to support the partial or complete polygonal central member in the outlet of the housing and supported at respective distal ends thereof by the housing at the outlet of the housing.

In accordance with one or more embodiments, the partial or complete polygonal central member is rectangular.

In accordance with one or more embodiments, the stiffening strut assembly includes reflective caps.

In accordance with one or more embodiments, the barrel is an optical black barrel and the stiffening strut assembly includes thermally isolated optical black struts.

According to an aspect of the disclosure, a directed energy (DE) system is provided and includes a housing defining an unobscured aperture for emitted electromagnetic (EM) radiation, the housing including a barrel having a single open end and defining a first opening through which the EM radiation passes and a mirror disposed in the barrel to reflect the EM radiation incident from the first opening and toward the single open end and a stiffening strut assembly installed at an outlet of the housing opposite the mirror and through which the emitted EM radiation passes.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A beam director subsystem often includes a source of electromagnetic radiation for generating, shaping, and/or controlling a high-energy (HE) laser beam and a tracking sensor suite with appropriate telescope. The electromagnetic radiation is directed to a secondary mirror or set of mirrors that reflects the electromagnetic radiation to a primary mirror for output of the HE laser beam. The tracking telescope is coupled to a housing and has a tracking detector configured to receive electromagnetic radiation originating from the HE laser and/or target. In certain embodiments, the tracking telescope is common aperture with the HE laser telescope. The beam director subsystem can further include an illuminator for targeting an airborne target and for generating electromagnetic radiation to be directed at the airborne target. The tracking detector can receive electromagnetic radiation reflected from the airborne target. A processor is typically coupled to the tracking detector and generates a control signal for input to a steering controller to steer the HE laser based at least in part on the received electromagnetic radiation from the airborne target. The processor processes target information for tracking the airborne target based at least in part on the received electromagnetic radiation.

In certain cases, unobscured apertures for HE laser telescopes perform better than those with obscurations. However, unobscured apertures tend to experience "fishmouth" structural modes due to various factors that degrade performance, specifically in high environmental loading situations. These "fishmouth" structural modes manifest as lateral and vertical deformations of telescope housings.

As will be described below, a HE laser telescope is provided with a stiffening rib design that improves system jitter performance by eliminating and/or mitigating the "fishmouth" structural modes. The HE laser telescope has an unobscured aperture with a managed, minor telescope obscuration (a configured stiffening strut/baffle) to improve system jitter in high vibration environments without sacrificing HE laser performance on the target. The HE laser telescope can further include improved thermal management of HE laser derived sources from short wave infrared (SWIR) and/or medium wave infrared (MWIR) viewing, thus reducing SWIR and/or MWIR tracking and imaging blinding in a common path HE laser transmission/image receiving aperture as well as provisions for a jitter observer system to further reduce jitter without affecting HE laser operations.

Figure 1:
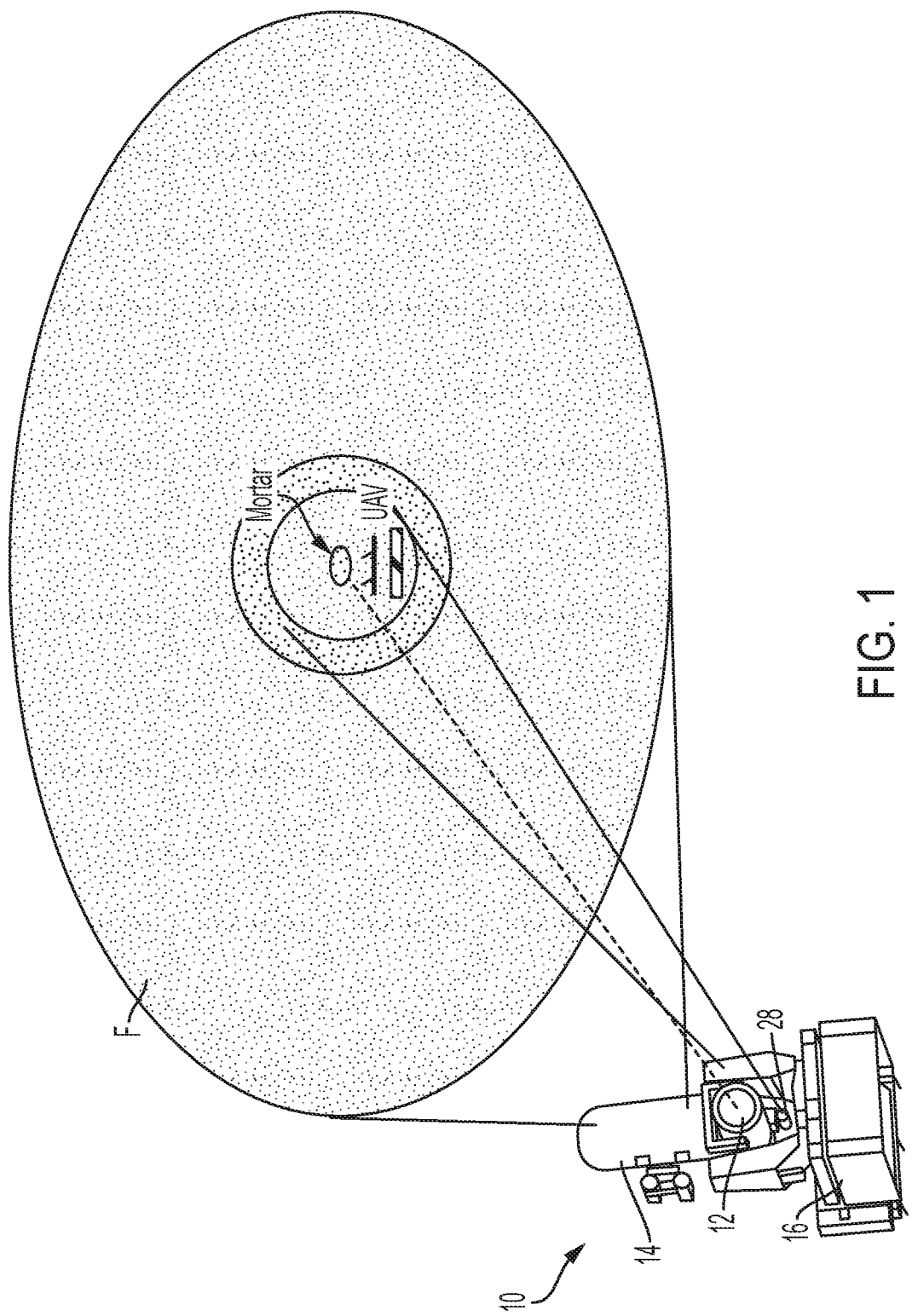
FIG. 1 is a perspective view of a weapons system in accordance with embodiments.

With reference to FIG. 1, a HE laser weapon system 10 includes a beam director subsystem 12, a radar 14 that detects objects (e.g., mortar shells, unmanned aerial vehicles (UAVs), etc.) in a field (F) and a base 16 that may be secured to a stationary (e.g., a fixed location on a military base) and/or a moving platform (e.g., a tank, ship, etc.) to secure the weapon system. The beam director subsystem 12 outputs a HE laser beam for use in depositing energy on the intended target, incapacitating an intended target, and/or otherwise destroying an intended target. The beam director subsystem 12 includes a HE laser beam system and a tracking system. The HE laser beam director subsystem 12 provides the guidance and control of the HE laser for the weapon system.

The beam director subsystem 12 includes a source of electromagnetic (EM) radiation for generating the HE laser HEL beam. The primary mirror receives EM radiation after an optical train (FIG. 2, 115) and reflects the EM radiation for output of the HE laser beam through a housing. The beam director subsystem 12 further may include a tracking telescope 28. The tracking telescope 28 has a track detector configured to receive a first portion and a second portion of the EM radiation of the HE laser beam. The tracking telescope 28 and the track detector are also configured to receive EM emitted by an illuminator and reflected off an intended target. A processor is coupled to the tracking detector and a steering controller to control the HE laser beam. The processor processes the first and second portions of the HE laser beam along with the EM radiation reflected from the intended target to steer the HE laser at the intended target. The HE laser beam may be any type of high energy laser that is capable of radiating EM radiation in a form to destroy and/or disable one or more intended airborne targets. In certain embodiments, the beam director subsystem 12, HE laser output telescope and some or all of the features of the tracking telescope 28 may be the same telescope, which can be referred to as a common aperture HE laser and track.

Figure 2:
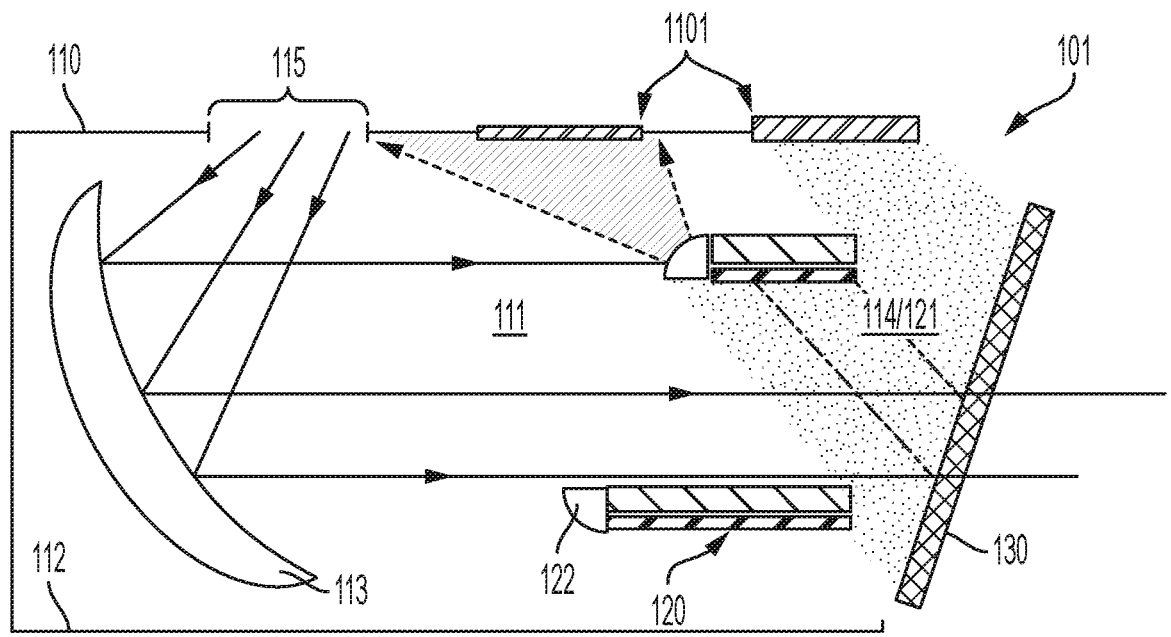
FIG. 2 is a side view of a high-energy (HE) laser for use in the weapons system of FIG. 1 in accordance with embodiments.
Figure 3:
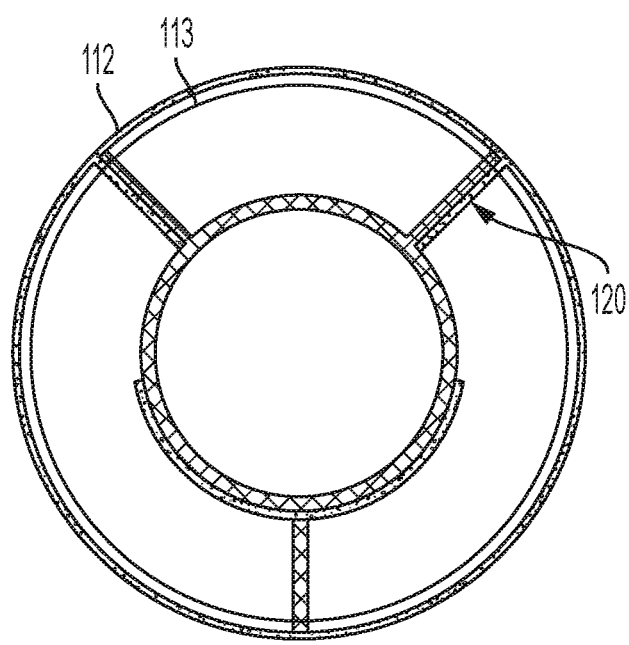
FIG. 3 is a front view of the high-energy laser of FIG. 2 in accordance with embodiments.

With reference to FIG. 2 and FIG. 3, a HE laser 101 is provided for use in a directed energy (DE) system, such as the beam director subsystem 12 of FIG. 1. As shown in FIG. 2, the HE laser 101 of the DE system includes a housing 110, a stiffening strut assembly 120 and a specular window 130 and/or opening (hereinafter referred to as a "specular window"). The housing 110 is formed to define an unobscured aperture 111 for emitted EM radiation and includes a barrel 112 and a mirror 113. The barrel 112 has a single open end 114 and is formed to define a first opening 115 through which the EM radiation passes as it propagates toward the mirror 113. The mirror 113 is disposed in the barrel 112 and is configured to reflect the EM radiation incident on the mirror 113 from the first opening 115 and toward the single open end 114. The stiffening strut assembly 120 is installed in the housing 110 at an outlet 121 of the housing 110 (i.e., the single open end 114) opposite the mirror 113 and is disposed and configured in the single open end 114 to permit the emitted EM radiation to pass through. The specular window 130 is disposed in the single open end 114 in a path of the EM radiation and may reflect a portion of the EM radiation away from the single open end 114. The stiffening strut assembly 120 can include reflective caps 122 that are disposed and configured to reflect the EM radiation, which is incident on the reflective caps 122, outwardly toward an interior surface of the barrel 112 and/or other energy and/or optical dumps 1101. The barrel 112 can be provided as an optical black barrel and the stiffening strut assembly 120 can include struts (to be described in greater detail below) that are provided as thermally isolated and/or optically black struts.

As shown in FIG. 3, the stiffening strut assembly 120 obscures a surface area of the mirror 113 and thus obscures a portion of the EM radiation emitted from the housing 110. However, due to the presence of the stiffening strut assembly 120, an incidence of "fishmouth" structural modes of the housing 110 is mitigated, eliminated, and/or at least substantially reduced. As such, a beam formed by the EM radiation emitted from the housing 110 has characteristic properties (i.e., focus performance and power-deposited-in-a-bucket) that are preserved over long distances (i.e., 3 km). This energy deposited over time in a specific area (or bucket) would be degraded without the presence of the stiffening strut assembly 120 due to jitter resulting from the "fishmouth" structural modes. Thus, the obscuration effect of the stiffening struct assembly 120 is effectively limited and/or neglectable.

Figure 4:
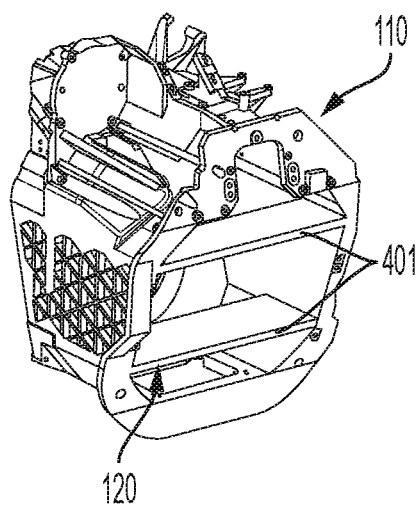
FIG. 4 is a perspective view of a housing of the high-energy laser of FIGS. 2 and 3A in accordance with embodiments.

With reference to FIG. 4, the stiffening strut assembly 120 can include horizontal baffles 401. The horizontal baffles 401 do not obscure the EM emitted from the HE laser 101 to a significant degree as explained above and are supported at opposite ends thereof by the housing 110 at the outlet 121 of the housing 110 or the single open end 114.

Figure 5:
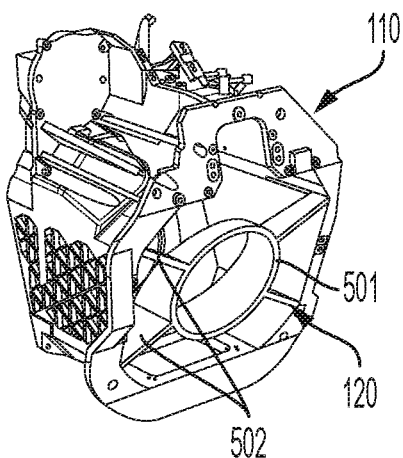
FIG. 5 is a perspective view of a housing of the high-energy laser of FIGS. 2 and 3A in accordance with embodiments.

With reference to FIG. 5, the stiffening strut assembly 120 includes a partial or complete annular central member 501 and multiple struts 502. The partial or complete annular central member 501 can be provided as a circular feature and/or partially circular feature and does not obscure the EM emitted from the HE laser 101 to a significant degree as explained above. The multiple struts 502 can be provided as thermally isolated optical black struts and are disposed to support the partial or complete annular central member 501 in the outlet 121 of the housing 110 or the single open end 114. The multiple struts 502 are supported at respective distal ends thereof by the housing 110 at the outlet 121 of the housing 110 or the single open end 114.

Figure 6:
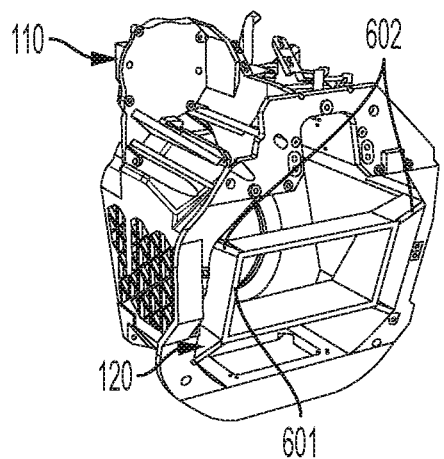
FIG. 6 is a perspective view of a housing of the high-energy laser of FIGS. 2 and 3A in accordance with embodiments.

With reference to FIG. 6, the stiffening strut assembly 120 includes a partial or complete polygonal central member 601 and multiple struts 602. The partial or complete polygonal central member 601 can be provided as a rectangular feature and/or any complete or partial polygon and does not obscure the EM emitted from the HE laser 101 to a significant degree as explained above. The multiple struts 602 can be provided as thermally isolated optical black struts and are disposed to support the partial or complete polygonal central member 601 in the outlet 121 of the housing 110 or the single open end 114. The multiple struts 602 are supported at respective distal ends thereof by the housing 110 at the outlet 121 of the housing 110 or the single open end 114.

Technical effects and benefits of the present disclosure include the provision of a telescope for DE applications, e.g., a HE laser telescope, with a stiffening rib design that improves system jitter performance by eliminating the "fishmouth" structural modes. The HE laser telescope has an unobscured aperture with a managed, minor telescope obscuration (a configured stiffening strut/baffle) to improve system jitter in high vibration environments without sacrificing power.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A directed energy (DE) system, comprising:
    a housing defining an unobscured aperture for emitted electromagnetic (EM) radiation; and
    a stiffening strut assembly installed at an outlet of the housing and through which the emitted EM radiation passes.

2. The DE system according to claim 1, wherein the housing comprises:
    a single open end that defines a first opening through which the EM radiation passes; and
    a mirror disposed to reflect the EM radiation toward the single open end.

3. The DE system according to claim 2, further comprising a specular window and/or opening disposed in the single open end in a path of the EM radiation.

4. The DE system according to claim 1, wherein the stiffening strut assembly comprises horizontal baffles supported at opposite ends thereof by the housing at the outlet of the housing.

5. The DE system according to claim 1, wherein the stiffening strut assembly comprises:
    a partial or complete annular central member; and
    multiple struts disposed to support the partial or complete annular central member in the outlet of the housing and supported at respective distal ends thereof by the housing at the outlet of the housing.

6. The DE system according to claim 5, wherein the partial or complete annular central member is circular.

7. The DE system according to claim 1, wherein the stiffening strut assembly comprises:
    a partial or complete polygonal central member; and
    multiple struts disposed to support the partial or complete polygonal central member in the outlet of the housing and supported at respective distal ends thereof by the housing at the outlet of the housing.

8. The DE system according to claim 7, wherein the partial or complete polygonal central member is rectangular.

9. The DE system according to claim 1, wherein the stiffening strut assembly comprises reflective caps configured to reflect the EM radiation.

10. The DE system according to claim 1, wherein:
    the housing is an optically black barrel, and
    the stiffening strut assembly comprises thermally isolated optical black struts.

11. A high-energy (HE) laser system, comprising:
    a housing defining an unobscured aperture for emitted electromagnetic (EM) radiation,
    the housing comprising a single open end and defining a first opening through which the EM radiation passes;
    a mirror disposed to reflect the EM radiation incident from the first opening and toward the single open end; and
    a stiffening strut assembly installed at an outlet of the housing opposite the mirror and through which the emitted EM radiation passes.

12. The HE laser system according to claim 11, further comprising a specular window and/or opening disposed in the single open end in a path of the EM radiation.

13. The HE laser system according to claim 11, wherein the stiffening strut assembly comprises horizontal baffles supported at opposite ends thereof by the housing at the outlet of the housing.

14. The HE laser system according to claim 11, wherein the stiffening strut assembly comprises:
   a partial or complete annular central member; and
   multiple struts disposed to support the partial or complete annular central member in the outlet of the housing and supported at respective distal ends thereof by the housing at the outlet of the housing.

15. The HE laser system according to claim 14, wherein the partial or complete annular central member is circular.

16. The HE laser system according to claim 11, wherein the stiffening strut assembly comprises:
   a partial or complete polygonal central member; and
   multiple struts disposed to support the partial or complete polygonal central member in the outlet of the housing and supported at respective distal ends thereof by the housing at the outlet of the housing.

17. The HE laser system according to claim 16, wherein the partial or complete polygonal central member is rectangular.

18. The HE laser system according to claim 11, wherein the stiffening strut assembly comprises reflective caps.

19. The HE laser system according to claim 11, wherein:
   the barrel is an optical black barrel, and
   the stiffening strut assembly comprises thermally isolated optical black struts.

20. A directed energy system, comprising:
   a housing defining an unobscured aperture for emitted electromagnetic (EM) radiation,
   the housing comprising:
      a barrel having a single open end and defining a first opening through which the EM radiation passes; and
      a mirror disposed in the barrel to reflect the EM radiation incident from the first opening and toward the single open end; and
      a stiffening strut assembly installed at an outlet of the housing opposite the mirror and through which the emitted EM radiation passes.

* * * * *